R. J. THIESEN & C. T. KING, Jr.
ANTISKIDDING DEVICE.
APPLICATION FILED DEC. 23, 1911.
1,048,376.
Patented Dec. 24, 1912.
3 SHEETS—SHEET 1.
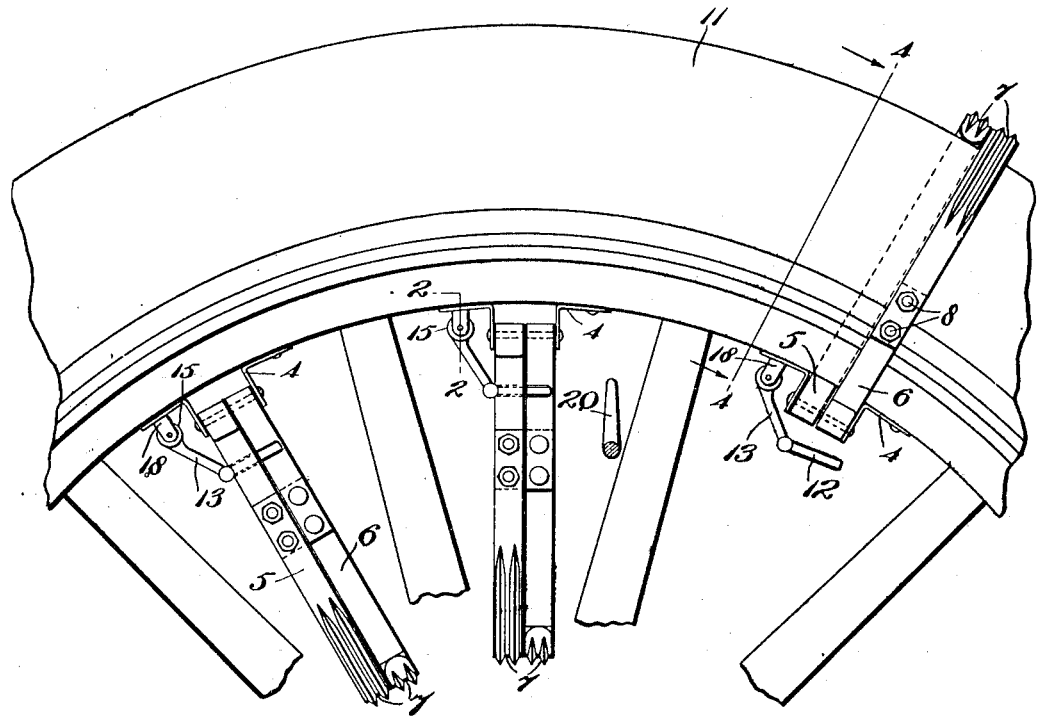
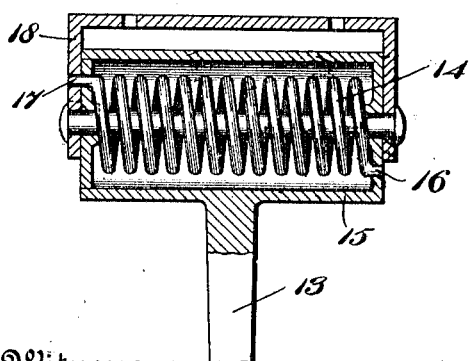
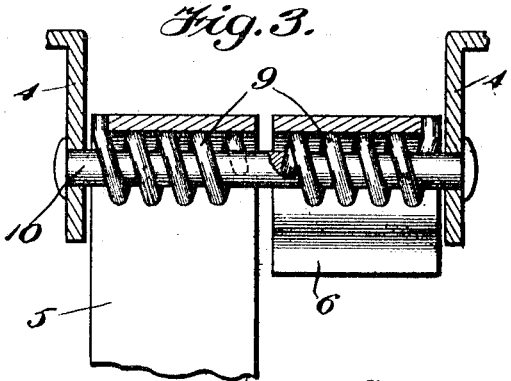
Witnesses
Byron B. Collings.
Edwin J. Beller.
Inventors
R. J. Thiesen, and
C. T. King, Jr. by
Wilkinson, Fisher & Witherspoon
their Attorneys

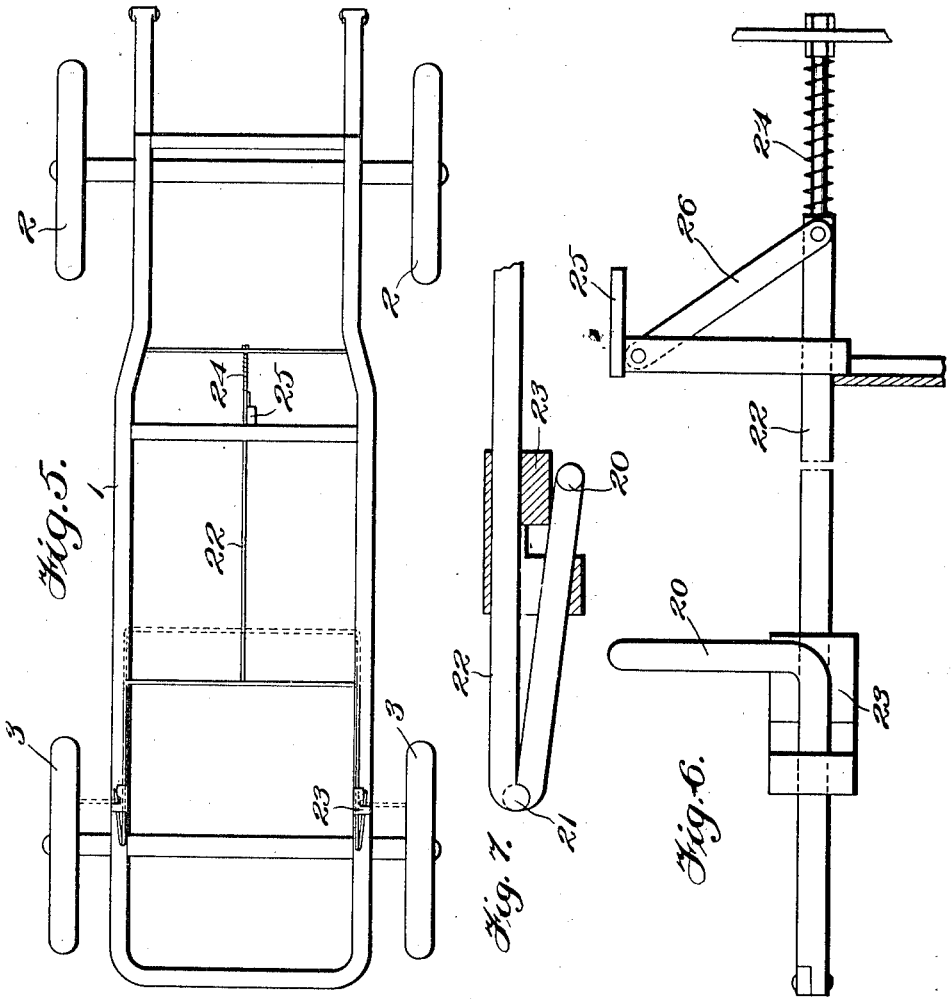
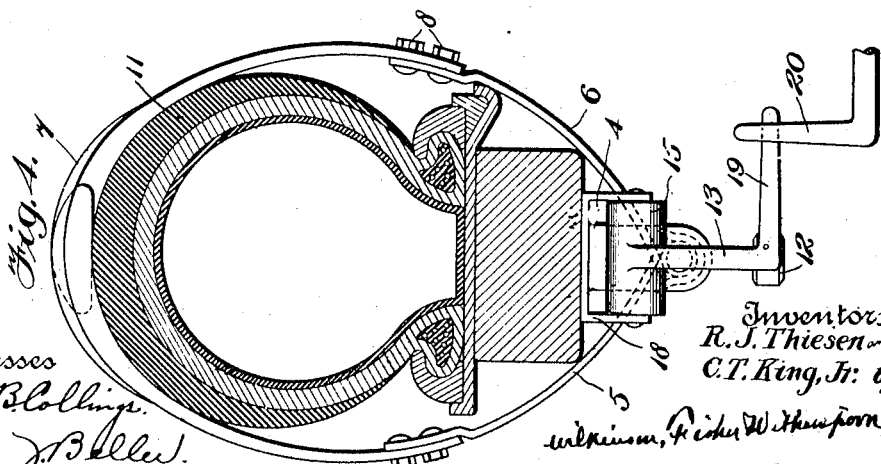

R. J. THIESEN & C. T. KING, Jr.
ANTISKIDDING DEVICE.
APPLICATION FILED DEC. 23, 1911.
1,048,376.
Patented Dec. 24, 1912.
3 SHEETS—SHEET 3.
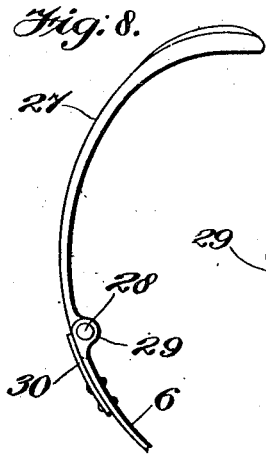
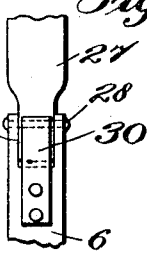
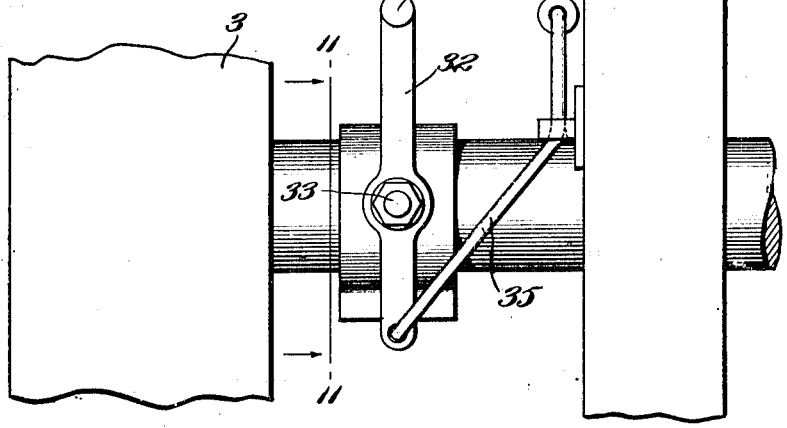
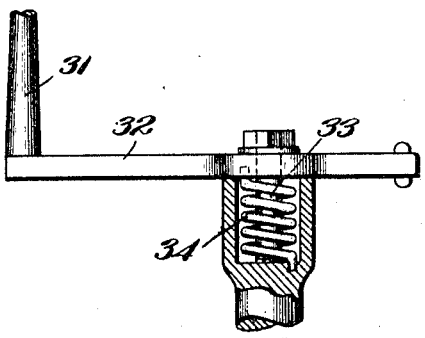
Witnesses
Byron B. Collings.
Edwin J. Beller.
Inventors
R. J. Thiesen, and
C. T. King, by
Wilkinson, Fisher & Witherspoon
their Attorneys

UNITED STATES PATENT OFFICE.

RUDOLPH JOHN THIESEN AND CAMPBELL THOMAS KING, JR., OF ATLANTA, GEORGIA

ANTISKIDDING DEVICE.

1,048,376.  Specification of Letters Patent.  Patented Dec. 24, 1912.

Application filed December 23, 1911. Serial No. 667,516.

*To all whom it may concern:*

Be it known that we, RUDOLPH J. THIESEN and CAMPBELL T. KING, Jr., citizens of the United States, residing at Atlanta, in the county of Fulton and State of Georgia, have invented certain new and useful Improvements in Antiskidding Devices; and we do hereby declare the following to be a full, clear, and exact description of the invention, such as will enable others skilled in the art to which it appertains to make and use the same.

Our invention relates to an improved antiskid device, and it consists in the constructions, combinations, and arrangements herein described and claimed.

An object of our invention is to provide an improved anti-skid device adapted to be normally locked in inoperative position and to be conveniently shifted into operative position from the driver's seat.

A further object of our invention is to provide a simple and compact device having anti-skid members adapted to swing over opposite sides of the tire into overlapping engagement, whereby such engagement acts to strongly brace the overlapping free ends of said members to provide a strong and rigid construction.

In the accompanying drawings forming a part of this application and in which similar reference symbols indicate corresponding parts in the several views:—Figure 1 is a fragmentary view of any usual type of automobile wheel, with one embodiment of our invention applied thereto; Fig. 2 is an enlarged section on the line 2—2 of Fig. 1; Fig. 3 is an enlarged, detail, axial section through the common pivotal support of a pair of anti-skid elements; Fig. 4 is a section on the line 4—4 of Fig. 1; Fig. 5 is a plan view of the chassis and running gear of a motor vehicle, with our invention applied thereto; Fig. 6 is an enlarged side elevation of the actuating means shown in Fig. 5; Fig. 7 is a detail plan of the shiftable links shown in Fig. 6; Fig. 8 is an edge elevation, illustrating a modified means for attaching the wear member; Fig. 9 is a fragmentary face view of the construction shown in Fig. 8; Fig. 10 is an enlarged detail plan, illustrating a modified construction for shifting the stop into the path of the fingers, and Fig. 11 is a section on the line 11—11 of Fig. 10.

Referring to the drawings:—1 indicates the chassis, or frame, of a vehicle, supported on the ground wheels 2 and 3. A series of brackets 4 are secured to the inner rim of the ground wheel for pivotally supporting pairs of coöperating anti-skid elements 5 and 6; said elements being shown with their wearing faces 7 removably attached by bolts 8, to enable convenient renewal of said faces.

Coiled springs 9 on the pivot 10 of each pair of elements are attached at their respective ends to said pivot and elements, to provide resilient means for automatically swinging the elements of each pair from opposite sides of the tire 11 into overlapping engagement on the latter; such overlapping ends of the elements acting to brace one another for providing a strong and rigid construction.

A latch 12 is carried by a crank 13 in position to be inserted between the two anti-skid elements of each pair for locking the latter in their inoperative position, as shown at the left in Fig. 1; said latch being yieldingly maintained in its locking position by a spring 14 having its respective ends 16 and 17 secured to a hollow hub 15 of said crank 13 and to an ear 18 on said bracket 4. A finger 19 extends laterally from each crank 13 in position for engagement by a stop, or abutment, 20 pivotally connected at 21 to a slidably mounted frame 22 and guided in a slotted block 23 for swinging said stop into and out of the path of said fingers 19 upon shifting of said frame 22.

The frame 22 is slidably mounted on the vehicle in any suitable manner, and yieldingly maintained by a spring 24 in position for retracting the stops 20 from the path of said fingers 19; a pedal 25 in position for convenient operation by the driver being connected to said frame 22 by a link 26, to provide means for readily shifting said frame against the tension of the spring 24 to swing the stops 20 into the path of the fingers 19.

Figs. 8 and 9 illustrate a modified construction, in which a wear member 27 is pivoted at 28 to the member 6, and provided with a lug 29 engaging a flat spring 30 for resiliently maintaining said wear member in normal position.

Figs. 10 and 11 illustrate a modified construction in which a stop 31 is mounted on a lever 32, which latter is secured to a spindle 33 normally maintained in inoperative position by a spring 34; a flexible member, such as a cable 35, operatively connects said lever to the slidable frame 22.

From the above description it will be clear that our invention provides an improved construction by which the driver can conveniently release the anti-skid elements at any time to permit of their automatic shifting into operative position on the wheel tire, and that said elements will be resiliently pressed in overlapping engagement on said tire; thereby providing a compact and strong construction adapted for convenient and efficient use under all conditions.

We have illustrated and described preferred and satisfactory constructions, but changes could be made within the spirit and scope of our invention.

We claim:—

1. In an anti-skid device for vehicle wheels, the combination of anti-skid elements pivoted to the wheel and extending from opposite sides thereof into lapping engagement on the tire tread.

2. In an anti-skid device for vehicle wheels, the combination of anti-skid elements pivoted to the wheel and provided with hinged wear members extending from opposite sides of the wheel into overlapping engagement on the tire tread, and resilient means on said anti-skid elements for yieldingly resisting swing of said wear members on their hinged connections.

In testimony whereof, we affix our signatures, in presence of two witnesses.

RUDOLPH JOHN THIESEN.
CAMPBELL THOMAS KING, JR.

Witnesses:
D. C. ASHLEY, Jr.,
WILLIS IRVIN.

---

Copies of this patent may be obtained for five cents each, by addressing the "Commissioner of Patents, Washington, D. C."